United States Patent [19]
Winters

[11] Patent Number: 5,302,153
[45] Date of Patent: Apr. 12, 1994

[54] AIR FILTERING DEVICE FOR A MOTOR VEHICLE

[76] Inventor: David J. Winters, R.R. #1, Box 162, Glenwood, Mo. 63541

[21] Appl. No.: 13,632

[22] Filed: Feb. 4, 1993

[51] Int. Cl.⁵ .............................................. B60H 3/06
[52] U.S. Cl. .................................... 454/158; 55/491; 55/501
[58] Field of Search .................. 55/491, 501; 454/158

[56] References Cited

U.S. PATENT DOCUMENTS

| | | |
|---|---|---|
| 1,808,170 | 6/1931 | Kamrath . |
| 2,213,017 | 8/1940 | Perkins .................. 454/158 |
| 2,316,526 | 4/1943 | McDonald ............... 160/382 |
| 3,693,410 | 9/1972 | Robrecht ................... 73/28 |
| 3,912,473 | 10/1975 | Wilkins ..................... 55/501 |
| 3,941,034 | 3/1976 | Helwig et al. .......... 454/158 X |
| 4,242,951 | 1/1981 | Bemiss ..................... 454/158 |
| 4,365,541 | 12/1982 | Marques ................... 454/158 |
| 4,523,870 | 6/1985 | Spector . |
| 4,587,890 | 5/1986 | Hurlburt ................... 454/158 |
| 4,630,530 | 12/1986 | Eckstrom . |
| 4,768,423 | 9/1988 | Boeger ..................... 454/158 |

FOREIGN PATENT DOCUMENTS

| | | |
|---|---|---|
| 1072567 | 9/1954 | France ................... 55/491 |
| 1210654 | 10/1970 | United Kingdom . |

*Primary Examiner*—Harold Joyce
*Attorney, Agent, or Firm*—Zarley, McKee, Thomte, Voorhees & Sease

[57] ABSTRACT

An air filtering device for a motor vehicle having a vent for air intake. The air filtering device includes a housing having a plurality of apertures disposed therein, a filter element, and connecting means to removably couple the housing and filter element to a position overlying the vent on the motor vehicle. The housing engages the body of the vehicle, and the filter element is positioned within the housing so that air normally passing into an air intake vent first passes through the apertures located in the housing and is filtered by the filter element. The air filtering device can take a variety of shapes and sizes so that any vent orientation may be adequately fitted and filtered. The air filtering device is easily removable for cleaning and/or replacement of the filter element.

18 Claims, 2 Drawing Sheets

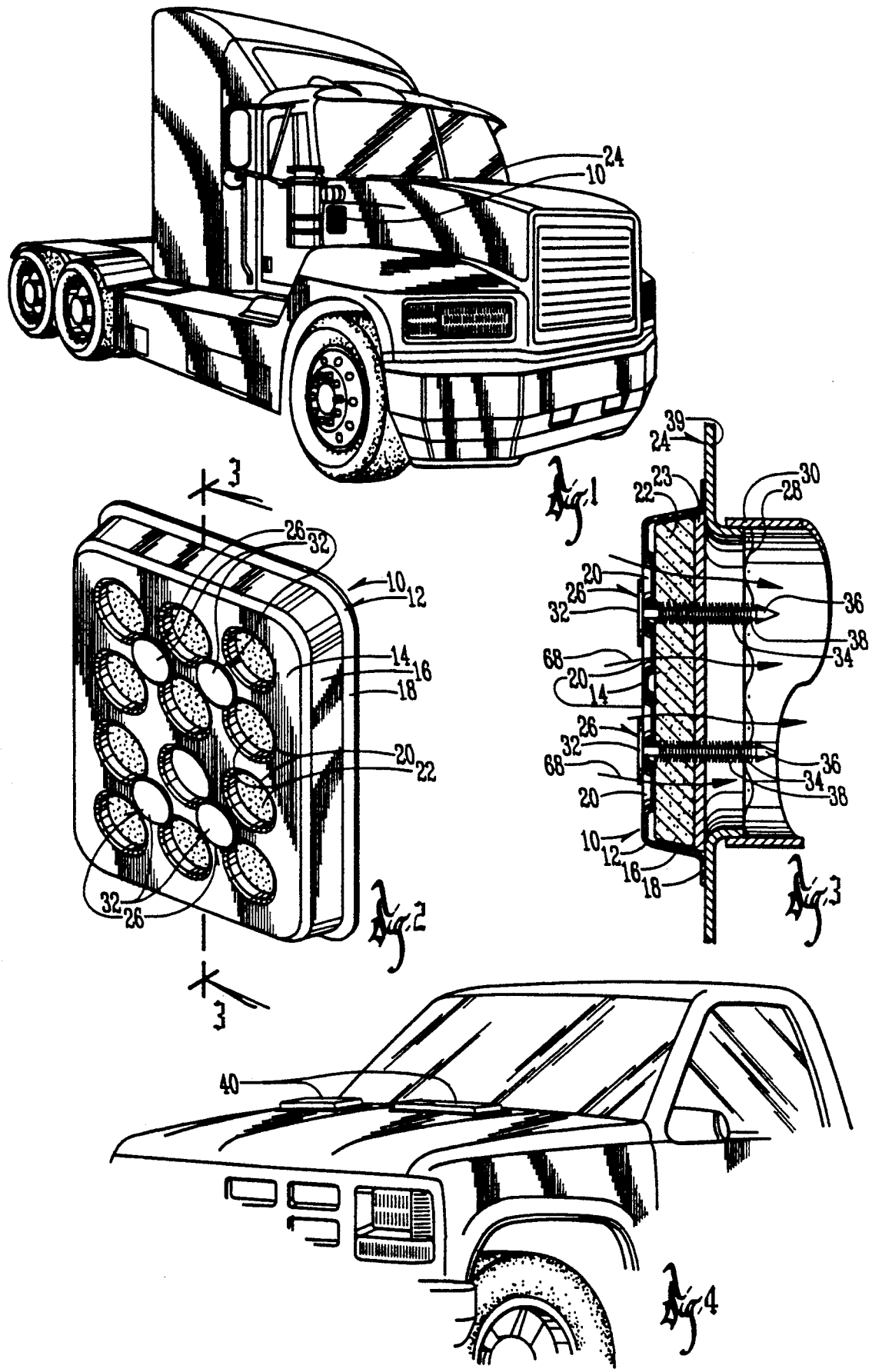

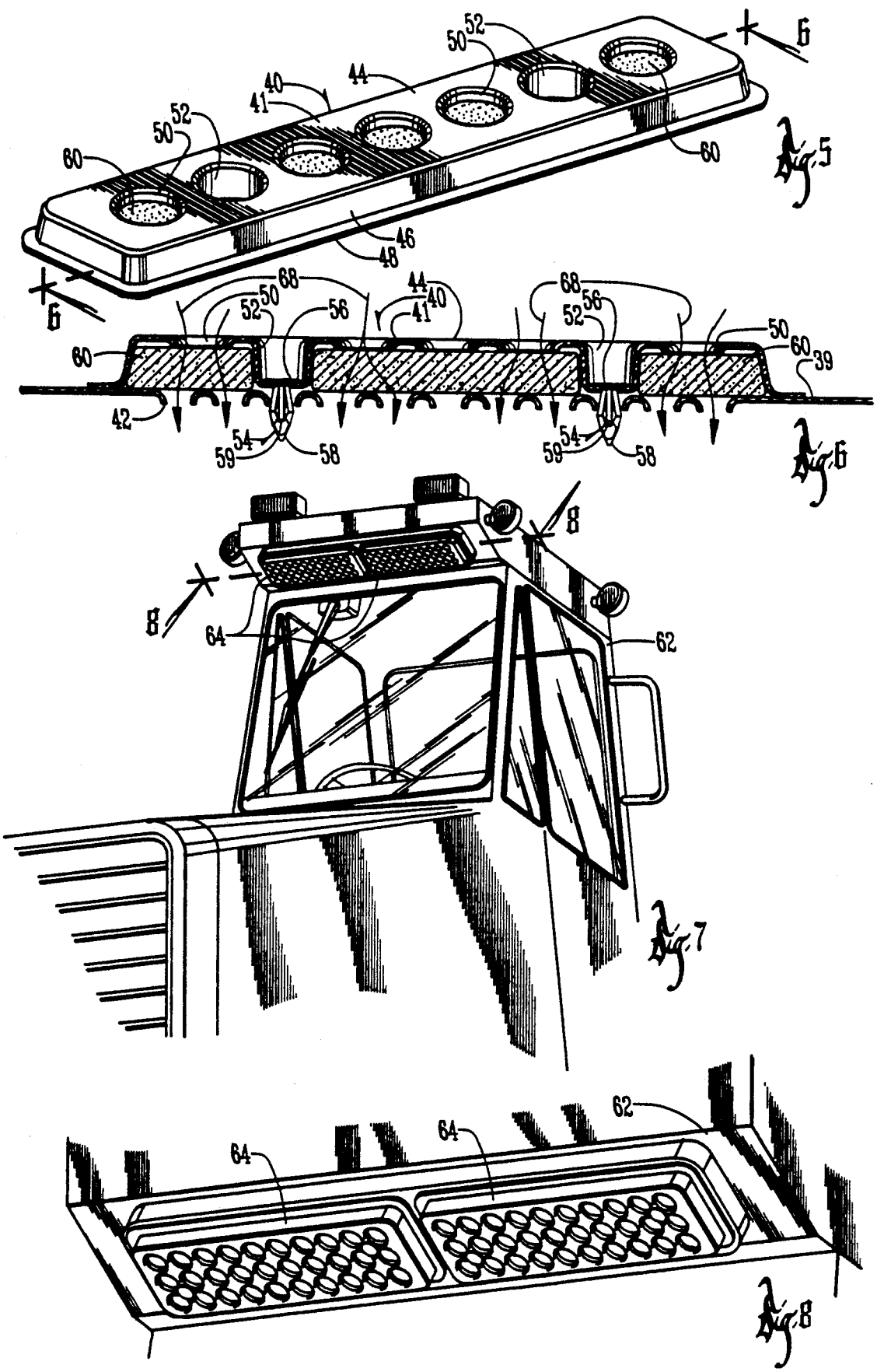

AIR FILTERING DEVICE FOR A MOTOR VEHICLE

BACKGROUND OF THE INVENTION

Trucks and other over-the-road vehicles, such as busses, travel many miles during a day. Dirt and dust are often deposited in the truck cab by travelling through the air ventilation system of the vehicles. More particularly, trucks typically do not have any air filter over the vent intake for the heater and air-conditioner. Thus, when the heater or air-conditioner is operated, air carrying dust and dirt particles flows through the system and eventually into the interior of the truck. The dirt and dust often times has an oil residue. The dirt and dust are deposited on the driver, as well as the seats, the dashboard, the gauges, the interior of the windshield, and the sleeping compartment. After a time, the buildup of dirt and dust creates bad odors. Furthermore, under the hood of the vehicles, the radiators become plugged, mold grows, odors are emitted, and air-conditioning drains become clogged by the presence of dirt and dust.

Therefore, a primary objective of the present invention is to provide an air filtering device for a motor vehicle having at least one air inlet opening.

Another objective of the present invention is the provision of an air filtering device for over-the-road vehicles which is removable and which can easily be replaced or cleaned.

Another objective of the present invention is the provision of an air inlet filtering device which removes or reduces dust, dirt, diesel soot, road grime, pollen and other foreign particles from the air before the air enters a truck cab or sleeping compartment.

Still another objective of the present invention is the provision of an air filtering device which is economical to manufacture, and durable, safe, and efficient in use.

These and other objectives will become apparent from the following description of the invention.

SUMMARY OF THE INVENTION

The air filtering device of the present invention is used on trucks and other over-the-road vehicles to remove airborne dust, dirt, soot, grime, pollan and the like from the air before the air enters the cab or sleeping compartment of the vehicle. The air filter includes a housing having a plurality of apertures therein. The housing is configured to match the shape of the air inlet vent for the heating and air conditioner system of the vehicle. An alternate embodiment is shaped to fit the cowl of the vehicle. A filter element fits within the housing and serves to remove foreign particles from the air passing through the filter element. Mounting posts quickly and easily allow the housing to be removably snap fit into the air inlet opening or cowl on the motor vehicle, with the housing engaging the exterior body of the vehicle. The filter element can be replaced or cleaned as desired. A charcoal element may also be provided to eliminate odors from the air before it enters the vehicle cab.

BRIEF DESCRIPTION OF THE DRAWINGS

FIG. 1 is a perspective view of a truck tractor having the filter device of the present invention installed over the heating and air conditioner air inlet.

FIG. 2 is a perspective view of one embodiment of the filter device.

FIG. 3 is a sectional view taken along lines 3-3 of FIG. 2.

FIG. 4 is a perspective view of a pickup truck having a second embodiment of the air filtering device of the present invention installed over the cowl.

FIG. 5 is a perspective view of the second embodiment of the filter device shown in FIG. 4.

FIG. 6 is a sectional view taken along lines 5-5 of FIG. 4.

FIG. 7 is a perspective view of a third embodiment of the filter device as used on an agricultural tractor.

FIG. 8 is an enlarged view of the device shown in FIG. 6.

DETAILED DESCRIPTION OF THE DRAWINGS

A first embodiment of the air filtering device of the present invention is generally designated in the drawings by the reference numeral 10. Air filter 10 includes a shell or housing 12 with a substantially planar outer wall 14, a sidewall 16, and a perimeter flange 18. A plurality of apertures 20 are formed in the outer wall 14. Apertures 20 may be arranged in an aesthetically pleasing or symmetrical orientation, shown in FIG. 2. A filter element 22 to remove airborne particles is positioned with the housing 12, as best seen in FIG. 3. A charcoal element 23 may also be fit within the housing 12 to remove odors from the air.

The air filtering device 10 is connected to the motor vehicle 24 by a plurality of mounting posts 26, which snap into the screen 28 which normally covers the air inlet or vent 30 for the heating and air conditioning system of the vehicle. The post 26 include a head 32 which engages the outer surface 14 of the housing 12 and a shaft 34 with a pointed end 36 for pushing through the filter element 22 and the screen 28. The shaft 34 includes thin angular projections or gripping member 38 for retentively engaging the screen 28. When mounted over the air inlet 28, the flange 18 of the housing 12 engages the body 39 of the vehicle. The device 10 can be pulled or pried from the screen 28 so that the filter element 22 can be changed or cleaned.

The present invention can take a variety of designs, depending on the shape and location of the air inlet on the vehicle. A second embodiment of the invention is shown in FIGS. 4 and 5. The air filtering device 40 of FIG. 4 is designed to fit the cowl vent 42 of the motor vehicle, as shown in FIG. 4. The device 40 is elongated and includes a housing 41 with an upper wall 44, a sidewall 46, a perimeter flange 48, and a plurality of apertures 50 aligned along the length of the housing. A pair of spaced apart recesses 52 are formed in the housing 41, so as to receive fasteners 54. The fasteners 54 include a head 56 and an expandable body 58 for securing the device 40 to the cowl 42. A plunger 59 slides into the body 58 to expand the body into retentive frictional engagement with the cowl 42. A filter element 60 with holes to receive the recesses 52 of the housing 41 is fit within the housing. The plunger 59 can be retracted so that the device 40 can be removed from the cowl, thereby allowing the filter element 60 to be changed or cleaned. A charcoal element (not shown) may also be employed on device 40 to remove air odors.

A third embodiment of the invention is shown in FIGS. 6 and 7, wherein the air filtering device 64 is positioned over an air conditioner inlet vent on the cab 62 of an agricultural tractor. The device 64 comprises a pair of housings and filter elements. The device 64 is essentially identical to the device 10 shown in FIGS. 1-3, other than its shape.

The air filtering device of the present invention can be designed for motor vehicles inlets and cowls of varying sizes and shapes. The housing of the device is typically made from a plastic, or other substantially rigid material. The filter element 22 is typically a foam-like, fibrous, or matrixed material which allows air to flow through it while trapping or absorbing airborne dust, dirt, soot, grime and other foreign particles.

The use of the air filtering device of the present invention is substantially the same for all embodiments. Therefore, the use of the device 10 shown in FIGS. 1-3 will be described, with the understanding that the other embodiments are used in a similar manner.

The flange 18 overlies and engages the vehicle body 66, as seen in FIG. 3. In use, the air filtering device 10 is attached to the air inlet vent 30 by inserting the mounting post 26 through the device 10 and into the vent screen 28. The filter element 22 and charcoal element 23 are contained within the housing 12 so that air passes through the apertures 20 and through the elements 22 and 23 in a direction designated by arrows 68. The filter element 22 traps any airborne particles, while the charcoal element removes odors from the air.

When the filter element 22 becomes sufficiently dirty, it can be changed or cleaned. The air filtering device 10 can be removed from the vent 30 simply by detaching the mounting post 18 from the vent 30. When device 10 is removed, the user may replace the used air filter element 22 with a new filter element, or alternatively, the element may be cleaned. Charcoal element 23 may also be changed. With a new or cleaned elements placed within the housing, the device 10 can be replaced over the vent 30 using mounting post 26.

Thus, the air filtering device of the present invention can be quickly and easily attached to removed from the motor vehicle. A separate air filtering device may be used on each heating and air-conditioning air inlet of the motor vehicle. The device is an after-market accessory which can be retrofit or used on any type of motor vehicle having an exterior air inlet or vent.

From the foregoing it can be seen that the present invention accomplishes at least all of the stated objectives.

What is claimed is:

1. An air filtering device for an over-the-road truck having an exterior body with at least one air inlet therein providing communication to a heating and air condition system of the truck, the air inlet having a screen therein, the device comprising:

a housing having an outer wall, a sidewall extending from the outer wall, and a substantially planar perimeter flange extending from the sidewall, and having a plurality of apertures extending through the outer wall, said housing positioned on the exterior body of the truck over the air inlet;

a filter element positioned within the housing adjacent the air inlet for removing airborne particles from the air; and connecting means extending through the housing to engage the screen for mounting the housing over the air inlet on the exterior body of the truck, the connecting means being removably secured to the screen, the flange of the housing engages a portion of the exterior body of the truck surrounding the air inlet, whereby air is first passed through the apertures and the filter element to remove particles from the air before the air enters the heating and air conditioning system of the truck.

2. The device of claim 1 wherein the housing is shaped to substantially cover the air inlet.

3. The device of claim 2 wherein the housing is rigid.

4. The device of claim 2 further comprising a charcoal element within the housing for removing odors from the air.

5. The device of claim 1 further comprising a charcoal element within the housing for removing odors from the air.

6. The device of claim 1 wherein the housing further comprises a plurality of recesses for receiving the connecting means.

7. The device of claim 1 wherein the connecting means includes a head for engaging the housing, a shaft extending through the filter element, and gripping means for removably frictionally engaging a portion of the screen.

8. The device of claim 7 wherein the connecting means includes a selectively expandable body for releasably frictionally engaging a portion of the screen.

9. The device of claim 1 wherein the outer wall of the housing is constructed of a rigid material so as to provide a protective covering over the filter element.

10. The device of claim 1 wherein the apertures of the housing are arranged in a grid pattern such that the outer walls forms a protective matrix over the filter element.

11. A motor vehicle filter kit having component parts capable of being assembled to filter airborne particles of matter before entering a passenger compartment of a motor vehicle, the motor vehicle having a body with an exterior and at least one air inlet located in the exterior of the body the air inlet having a screen therein, the air inlet communicating with the passenger compartment, the kit comprising the combination of:

a filter means adapted to be fitted over the air inlet of the motor vehicle;

a housing adapted to engage the body of the vehicle in a position over the filter means and hold the filter means in a position over the air inlet on the exterior of the motor vehicle, the housing containing apertures to allow air to flow from outside the motor vehicle through the filter means and air inlet, and into the passenger compartment of the vehicle; and connecting means adapted to be affixed at a first end to the housing and removably affixed at a second end to the screen, whereby the housing may be positioned over the filter means and removably attached to the screen.

12. The kit of claim 11 further comprising a charcoal element adapted to fit within the housing to remove odors from the air entering the air inlet.

13. The kit of claim 11 wherein the housing includes an outer wall which fits in covering relation over the filter means so as to protect the filter means from damage.

14. An air filtering device for mounting over an air inlet on a motor vehicle exterior, the air inlet providing air to a passenger compartment in the vehicle, the device comprising:

a housing having a perimeter flange for engaging the body of the vehicle, sidewalls extending outwardly from the flange, and an outer wall extending between the sidewalls in covering relation over the air inlet;

a filter element mounted within the housing for removing particles from the air before the air passes into the air inlet of the vehicle; and a plurality of fasteners extending through the housing for securing the housing to a screen within the air inlet.

15. The device of claim 14 further comprising a charcoal element within the housing for removing odors from the air.

16. The device of claim 14 wherein the housing is rigid.

17. The device of claim 14 wherein the housing includes recesses for receiving the fasteners.

18. The device of claim 14 wherein the outer wall includes substantially rigid grid portions extending in protective covering relation over the filter element.

* * * * *